Figure 1:
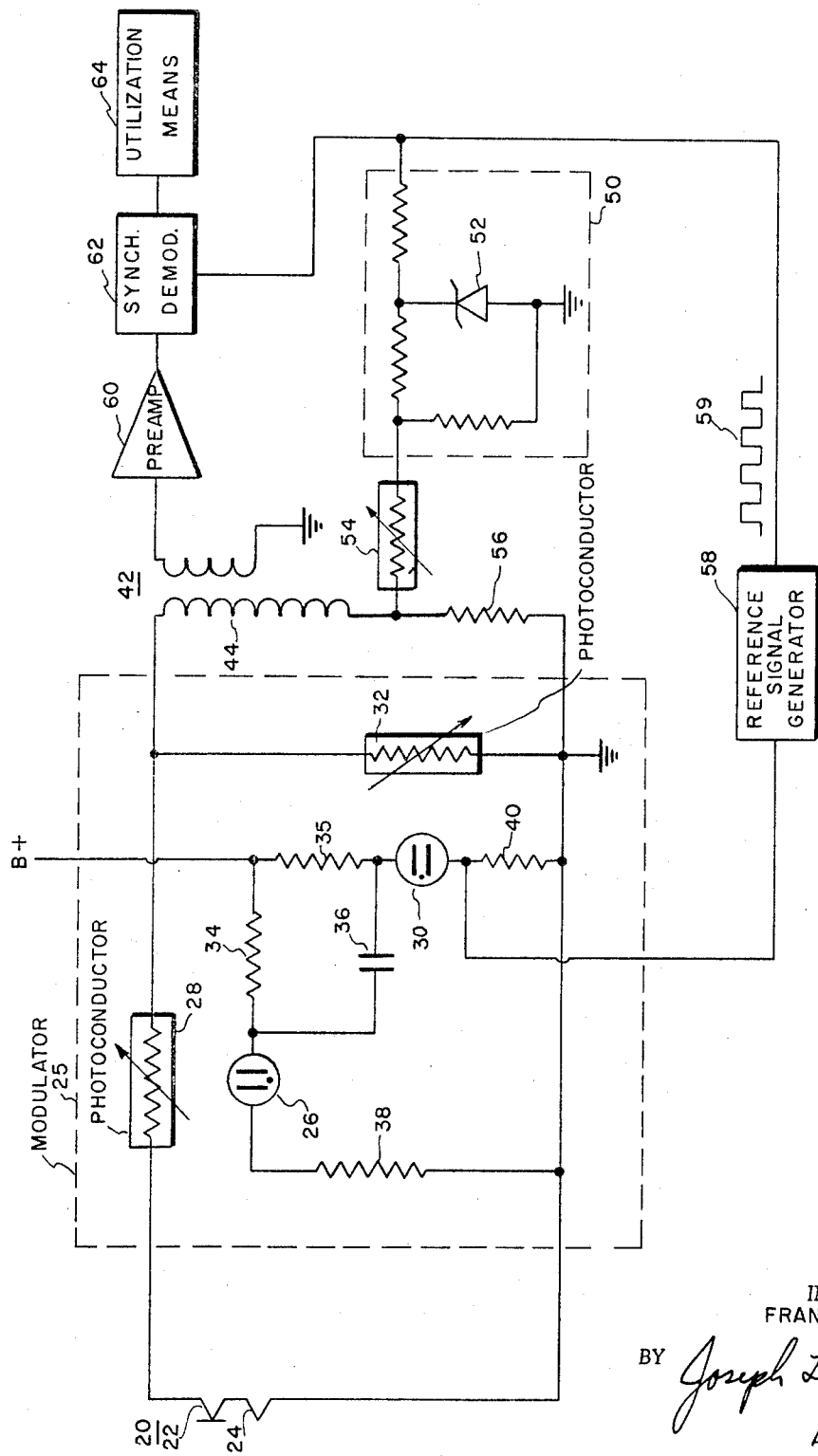

INVENTOR.
FRANK SCHWARZ
BY Joseph Levinson
ATTORNEY

Sept. 20, 1966      F. SCHWARZ      3,273,395
AUTOMATIC AMBIENT TEMPERATURE COMPENSATION
FOR A MEDICAL THERMOMETER
Filed Aug. 5, 1963      2 Sheets-Sheet 2

INVENTOR.
FRANK SCHWARZ
BY *Joseph Levinson*
ATTORNEY 3,273,395
AUTOMATIC AMBIENT TEMPERATURE COMPENSATION FOR A MEDICAL THERMOMETER
Frank Schwarz, Stamford, Conn., assignor to Barnes Engineering Company, Stamford, Conn., a corporation of Delaware
Filed Aug. 5, 1963, Ser. No. 299,841
7 Claims. (Cl. 73—355)

This invention relates to radiometers which are used for performing measurements of high accuracy, such as medical thermometers, and more particularly to radiometers of this type which are provided with automatic ambient temperature compensation.

Infrared radiometers which are used for medical or other applications are required to make temperature measurements of high accuracy over wide ranges of ambient temperature. Unless the detector is operated in a controlled ambient temperature environment, a change in ambient temperature will be just as effective in changing the detector output as will a change in temperature of the object whose temperature is being measured. Although it is possible to monitor ambient temperature, which can be utilized to calibrate the measurement being made by the radiometer, automatic correction is desirable so that absolute temperature readings may be obtained without calculation or further interpretation. This would be particularly true in the case of a medical thermometer, where it is desired to measure and record the patient's temperature without further calibration.

Accordingly, it is an object of this invention to provide radiometric measurements which are substantially independent of the temperature of the detector and its associated components.

A further object of this invention is to provide a medical thermometer in which automatic ambient temperature compensation is provided so that absolute temperature readings are instantaneosuly obtained.

Still another object of this invention is to provide a portable, unitary, medical thermometer which performs accurate temperature measurements over wide ranges of ambient temperature.

One solution to the ambient temperature problem, of course, is to control the temperature of the detector by enclosing the detector in a constant temperature environment. For a number of applications, such as that of a medical thermometer, the instrument must be ready and operable instantly, precluding the use of a heated detector compartment which would require many minutes to reach a stable temperature. Moreover, the power requirements and costs are prohibitive. The power requirements for controlling the temperature of the detector environment would also prevent portability of the instrument.

Accordingly, it is another object of this invention to provide radiometric measurements over wide ranges of ambient temperature without controlling the temperature of the detector and its environment.

In carrying out this invention in one illustrative embodiment thereof, an amplitude stable alternating voltage source is provided, and attenuated by a voltage divider which includes a temperature sensitive element. The voltage thus produced varies with ambient temperature and is mixed with a modulated signal from a detector which is receiving radiation from the object whose temperature is to be measured. The resultant signal is then amplified, synchronously demodulated, and applied to a utilization means for producing absolute readings. The alternating voltage source which provides compensation may be derived from a reference generator which is utilized for synchronous demodulation; thus an extra voltage source is not required. This form of ambient temperature compensation is utilized in a more specific form of the invention, which is a portable medical thermometer utilized for taking the temperature of patients by inserting a projection thereon into the ear canal.

Figure 2:
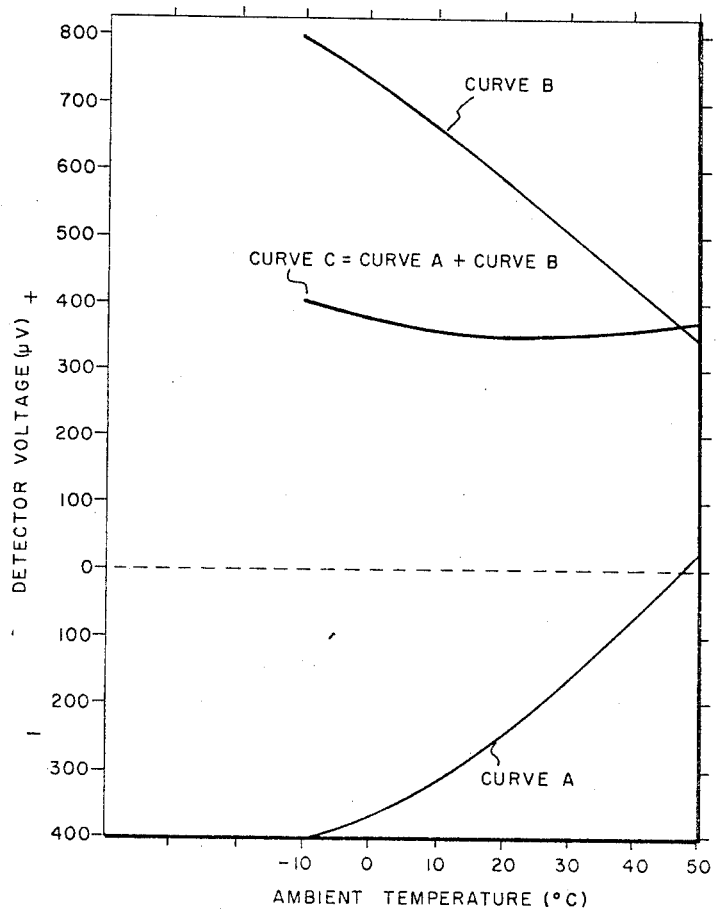
Figure 3:
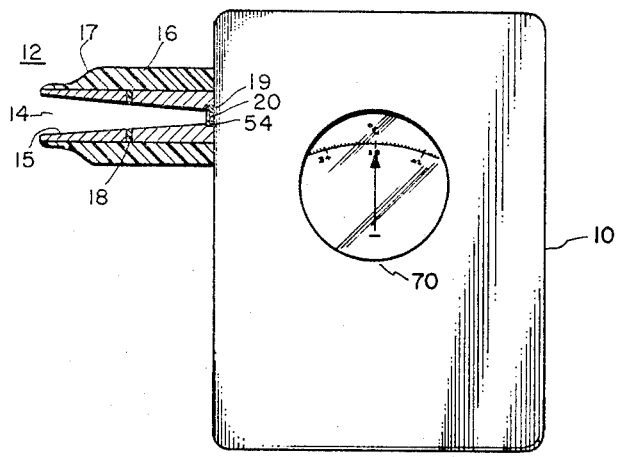

The invention, both as to organization and method of operation, together with further objects and advantages thereof, may best be understood by reference to the following description, taken in connection with the accompanying drawings, in which:

FIG. 1 is a schematic diagram, partly in block form, of the automatic ambient temperature compensation circuit embodied in this invention, FIG. 2 is a graph of voltage output versus ambient temperature to illustrate the manner in which compensation is provided for a specific case, and FIG. 3 shows, partly in cross-section, the medical thermometer embodied in this invention which utilizes the circuitry as shown in FIG. 1.

The present invention is applicable for all radiation detectors whose output changes in accordance with ambient temperature variations. Since its greatest application comes in the infrared field, the invention will be described in connection with thermal detectors, and more specifically, thermocouples and thermopiles, although it is not restricted thereto.

The thermocouple is comprised of two dissimilar metals which form an active, or hot, junction on which radiation is received or directed, and a reference junction, which is not exposed to radiation. The voltage developed by the thermocouple junctions depends on a difference in temperature between the hot junction and the reference junction. Accordingly, when the junctions are at the same temperature, no thermal E.M.F. exists. It is apparent that a change in the temperature of the reference junction is just as effective in changing the net thermocouple output as will a change in temperature of the object whose temperature is to be measured. The temperature of the reference junction, unless controlled, will normally conform to the environmental, or ambient temperature of the detector and its associated support and components. If it is desired to obtain absolute readings of the temperature of an object, the temperature of the reference junction must be maintained at a fixed or known temperature, or non-linear means must be provided which compensates for changes in reference junction temperature. This compensation is provided for automatically by the circuitry as shown in FIG. 1, which responds to changes in temperature of the reference junction.

Referring now to FIG. 1, a thermopile, referred to generally with the reference character 20, is comprised of thermocouples having a plurality of active junctions 22 (one shown) which receive radiation from objects or a target whose radiation is under observation, and a plurality of reference junctions 24 (one shown). The output of the thermopile 20 is applied to a modulator 25. The modulator 25 functions to convert the minute signals from the thermopile 20 to alternating current signals for further processing. The modulator 25 is illustrated as a neon light photoconductor modulator, but may be of a different type, such as a mechanical, solid-state, or other suitable type for converting D.C. signals from the thermopile to A.C. signals. As will be explained subsequently, a photoconductor modulator is preferable for use in a portable medical thermometer. The modulator 25 as shown is a neon light relaxation multivibrator which generates a square wave from the output of the thermopile 20. The modulator 25 includes photoconductive cells 28 and 32 of cadmium selenide, cadmium sulphide, or other suitable photoconductive material, and a pair of standard neon bulbs 26 and 30. The photoconductive cells 28 and 32 may be cemented directly on the bulbs 26 and 30, respectively. A source of positive potential is applied to one set of electrodes of neon bulbs 26 and 30 through resistors 34 and 35, respectively. These same electrodes are coupled via a coupling capacitor 36. The other set of electrodes of neon bulbs 26 and 30 are connected via dropping resistors 38 and 40, respectively, to ground. Since the firing potentials of the neon bulbs 26 and 30 are not the same, at the instant that B+ is applied, one of the bulbs begins conducting while the other remains inactive. Conduction takes place until the charge on the capacitor 36 becomes sufficiently large to cause conduction in the other bulb, at which time the bulb which has been conducting is extinguished. The frequency of operation depends upon the time constant of resistor 34 and capacitor 36, and resistor 35 and capacitor 36. The neon bulb relaxation multivibrator 25 generates a square wave which appears across the dropping resistor 40, which is utilized to drive a reference signal generator 58, which amplifies the square wave so generated to produce a wave 59 which is applied to a synchronous demodulator 60. The operation of the modulator 25 modulates the output of the thermopile 20 in the form of a square wave which is coupled by a transformer 42 to a preamplifier 60, and then to the synchronous demodulator 62 which provides a direct current output to a utilization means 64 which may be in the form of a recorder, meter, display means, etc.

Ambient temperature compensation for the circuit of FIG. 1 is provided in the following manner. An amplitude stable alternating voltage source 50 is established through the use of a Zener diode 52 which is coupled to the reference signal generator 58. A voltage divider comprised of a temperature-sensitive resistor 54, such as a thermistor, and a resistor 56 are connected across the amplitude stable alternating voltage source 50 to attenuate this voltage for providing the desired compensation at a given ambient temperature. The resistor 56 is connected between the primary winding 44 of transformer 42 and ground. The resistance of resistor 54 is substantially greater than the resistance of resistor 56, which, for example, may be on the order of 10 ohms. Accordingly, the voltage divider produces a square wave output whose amplitude varies in accordance with ambient temperature which is mixed with the modulated output of the thermopile 20 to produce an algebraic summation of the two signals to compensate the modulated thermopile output for ambient temperature changes. The frequency of the mixed outputs are the same, since they are derived from the same source.

To illustrate the operation of the circuit of FIG. 1, as the ambient temperature increases, the output of the thermopile 20 is reduced when it views a warm target. If resistor 54 has a negative temperature coefficient, the resistance of resistor 54 becomes smaller, and a larger amplitude alternating voltage is applied to the transformer 42 which is added to the modulated thermopile output to effectively increase the thermopile output and thereby provide compensation for ambient temperature changes. Through the proper choice or control of the non-linear resistance element 54, the circuit of FIG. 1 can be made to respond as if the temperature of the reference junction 24 were at a fixed value. The use of an amplitude-stabilized alternating voltage which is varied in accordance with ambient temperature provides a very substantial advantage over prior methods of compensation in which the thermistor, or non-linear element, was coupled in series with or across the thermopile output. In so doing, the signal from the thermopile is greatly attenuated, and if a small signal is all that is available, such a means of compensation is not at all practical. By utilizing an amplitude stabilized alternating voltage source which injects small amounts of compensating voltage to the modulated thermopile output, the aforesaid problem is eliminated and a practical solution is provided. Additionally, the A.C. automatic temperature compensation and offset circuit uses a readily available voltage source, i.e., reference signal generator 58, so require no extra batteries or additional sources. This makes portable instruments, such as the medical thermometer to be described subsequently, more feasible by reducing the weight and size of such instruments.

To graphically illustrate the manner in which ambient temperature compensation is provided by the circuit of this invention reference is now made to FIG. 2, which is a graph of detector voltage versus ambient temperature. For the specific example which is shown in FIG. 2 the target temperature is a constant 60° C., while the ambient temperature of the detector is varied. Curve A shows the detector signal output of negative phase which increases with ambient temperature. To compensate for changes in detector ambient temperature, the compensation signal represented by curve B is of opposite phase and decreases with increasing ambient temperature. The resultant calculated signal represented by curve C, which is a summation of curves A and B, shows a marked improvement with a relatively flat response over the temperature range shown. With target temperature changes the error will be equivalent to plus or minus 1° C. By the proper selection of circuit parameters for the temperature ranges which are to be encountered, the results shown in FIG. 2 may be achieved and in many cases improved.

Although the ambient temperature compensation circuit as shown in FIG. 1 has a wide range of applicability to radiometric measurements, they are particularly useful for medical thermometer application. This type of instrument is shown in FIG. 3, in which the medical thermometer may be enclosed by a unitary case 10 having a meter 70 mounted thereon, which can provide direct readings of absolute temperature. The medical thermometer is provided with a snout or projection 12 thereon, which is adapted to be inserted in the ear canal of the patient whose temperature is to be measured. The snout or projection 12 has a conical opening 14 therein, with the base of the cone being positioned on the outer extremities, and the inside of the opening 14 having a mirrored surface 15 thereon. The conically shaped mirrored surface 15 collects radiation from the ear canal, which acts almost as a perfect blackbody radiator, and the conical opening in projection 12 provides an optical gain from the ear canal to the thermopile 20 which is mounted in the apex of the conical shaped opening with its reference junctions 24 positioned on a common substrate 19. The conical optics are surrounded by a collar 16 of thermal insulating material which includes a ridge or shoulder 17 thereon to prevent too deep a penetration into the ear canal. It is not necessary, or even desirable, that the projection 12 come into contact with the ear drum. The snout merely serves as a means for aiming the instrument to view the ear canal which acts as an almost perfect black-body radiator. The conical shoulder on the snout serves as protection against accidental insertion of the snout deep into the canal. The non-linear element 54, which may be a thermistor, is mounted directly on the substrate supporting the thermopile reference junction 24 to provide compensation for changes in the environment temperature in which the thermopile 20 is mounted. The conical collector is broken along an intermediate point therein by an annular thermal insulator 18 to prevent self-emission on the elongated end of the cone from producing self-emission error.

By providing compensation for ambient temperature changes in which the instrument is to operate, it is not necessary to maintain the reference junctions of the thermopile at a fixed environmental temperature. If it were required to maintain the thermopile 20 at a fixed temperature, the warming time and additional power requirements for such control would limit the usefulness of the instrument. The neon bulb modulator can be powered by batteries and is relatively inexpensive from the standpoint of assembly and cost of parts, so that it may be mounted in the unitary casing 10 along with batteries to furnish the necessary power for it, the amplifier, and the detector. Since the reference signal generator serves as the A.C. compensation source, no additional batteries are required.

Of course, the advantage of having a clearly portable medical thermometer which provides absolute temperature readings almost instantaneously, is believed obvious over the use of glass thermometers as are presently used. Readings appear instantly, without discomfort or danger to the patient. For the taking of body temperature the range which need be considered would be between 34° C. and 42° C., which is such a narrow range that a greatly expanded temperature scale can be provided.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A radiometer for measuring temperature which includes automatic compensation for ambient temperature changes comprising
    (a) an infrared detector,
    (b) means for applying radiation from an object whose temperature is to be measured on said detector,
    (c) an amplitude stable alternating voltage source,
    (d) a voltage divider connected to said amplitude stable alternating voltage source which divider includes a temperature responsive resistor located in the proximity of said detector,
    (e) modulator means for modulating the output of said detector,
    (f) means for mixing the outputs of said modulator means and said voltage divider,
    (g) amplifying means for amplifying the mixed modulated outputs,
    (h) demodulator means for synchronously demodulating the output of said amplifying means in synchronism with said modulator means, and
    (i) utilization means coupled to said demodulator means for providing an indication of the temperature of the object being measured.

2. The structure set forth in claim 1 wherein said modulator is a photomodulator which includes a pair of neon bulbs interconnected by an R-C network and a pair of photoconductive detectors which are alternately actuated by said neon bulbs.

3. The structure set forth in claim 1 wherein said radiometer is enclosed in a unitary casing having an elongated projection thereon which is adapted to fit into an ear cavity in which the projection is positioned with respect to said infrared detector to provide optical gain between the ear cavity and said detector.

4. The structure set forth in claim 1 including a reference signal generator connected between said modulator and said demodulator, and means connected to said reference signal generator for providing said amplitude stable alternating voltage source.

5. A medical thermometer for measuring body temperature comprising, in combination,
    (a) a casing having an elongated projection thereon adapted to fit in the ear cavity,
    (b) said projection having an outer ridge thereon for limiting the amount of penetration into the ear cavity and a conical shaped opening therethrough having a mirrored surface thereon with the base of the conical opening positioned at the end of the projection which is inserted in the ear cavity,
    (c) a radiation detector mounted in the apex of said conical opening for producing a signal in response to incident radiation thereon,
    (d) modulator means connected to said detector for modulating said signal,
    (e) compensation means associated with said detector and connected in circuit with said modulator means for compensating for ambient temperature changes,
    (f) a preamplifier coupled to said modulator means,
    (g) a synchronous demodulator means connected to said preamplifier, and
    (h) a meter connected to said synchronous demodulator means for providing an indication of the temperature of the patient whose temperature is being measured.

6. The medical thermometer set forth in claim 5 wherein said modulator comprises a photomodulator.

7. The medical thermometer set forth in claim 5 including
    (a) a reference signal generator connected between said modulator means and said synchronous demodulator means,
    (b) means connected to said reference signal generator for producing an amplitude stable alternating voltage source, and
    (c) means to vary said amplitude stable alternating voltage in accordance with the ambient temperature of said detector to provide compensation for said detector.

References Cited by the Examiner
UNITED STATES PATENTS

| 3,081,399 | 3/1963 | Schwarz | 73—355 |
| 3,156,117 | 11/1964 | Benzinger | 73—343 |

LOUIS R. PRINCE, *Primary Examiner.*